US011036667B2

(12) United States Patent
Saha et al.

(10) Patent No.: US 11,036,667 B2
(45) Date of Patent: Jun. 15, 2021

(54) SYSTEM AND METHOD TO SCALE BASEBOARD MANAGEMENT CONTROLLER MANAGEMENT OF STORAGE INSTRUMENTATION

(71) Applicant: DELL PRODUCTS, LP, Round Rock, TX (US)

(72) Inventors: Rajib Saha, Bangalore (IN); Bharath Koushik Bangalore Suryanarayana, Bangalore (IN); Parmeshwr Prasad, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/371,328

(22) Filed: Apr. 1, 2019

(65) Prior Publication Data

US 2020/0311008 A1    Oct. 1, 2020

(51) Int. Cl.
*G06F 3/00* (2006.01)
*G06F 13/42* (2006.01)
*G06F 3/06* (2006.01)
*G06F 9/54* (2006.01)

(52) U.S. Cl.
CPC ............ *G06F 13/42* (2013.01); *G06F 3/0604* (2013.01); *G06F 3/067* (2013.01); *G06F 3/0659* (2013.01); *G06F 9/54* (2013.01)

(58) Field of Classification Search
CPC ................................ G06F 9/54; G06F 3/0604
USPC ........................................................ 719/310
See application file for complete search history.

(56) References Cited

U.S. PATENT DOCUMENTS

| 6,073,172 | A | 6/2000 | Frailong et al. |
|---|---|---|---|
| 8,566,246 | B2 | 10/2013 | Karandikar |
| 9,686,174 | B2 | 6/2017 | Cole et al. |
| 9,817,754 | B2 | 11/2017 | Kandasamy et al. |
| 10,346,187 | B1 * | 7/2019 | Trier ...................... G06F 9/455 |
| 2011/0202685 | A1 * | 8/2011 | Subramaniam ....... G06F 15/177 709/245 |
| 2013/0003288 | A1 | 1/2013 | Kanapathippillai et al. |
| 2014/0095769 | A1 | 4/2014 | Borkenhagen |
| 2015/0248320 | A1 | 9/2015 | Aravot |
| 2016/0156725 | A1 | 6/2016 | Lai et al. |
| 2019/0026125 | A1 * | 1/2019 | Preimesberger .... G06F 9/44505 |
| 2019/0075020 | A1 | 3/2019 | Leal Monteiro |

OTHER PUBLICATIONS

D. Makowski, Standardized Solution for Management Controller for MTCA.4. (Year: 2015).*

* cited by examiner

*Primary Examiner* — Lechi Truong
(74) *Attorney, Agent, or Firm* — Larson Newman, LLP

(57) ABSTRACT

An information handling system includes a baseboard management controller (BMC) configured to communicate with a processor via a BMC-to-Operating System (OS) communication link, and a first device coupled to the processor and including a Management Component Transport Protocol (MCTP) module. The MCTP module provides access to a first manageability feature of the first device. A BMC agent a) receives a first MCTP command from the BMC via the BMC-To-OS communication link, the first MCTP command to configure the first manageability feature, and b) provides the first MCTP command to the MCTP module.

17 Claims, 3 Drawing Sheets

SYSTEM AND METHOD TO SCALE BASEBOARD MANAGEMENT CONTROLLER MANAGEMENT OF STORAGE INSTRUMENTATION

FIELD OF THE DISCLOSURE

This disclosure generally relates to information handling systems, and more particularly relates to scaling baseboard management controller management of storage instrumentation.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A baseboard management controller (BMC) may communicate with a processor via a BMC-to-Operating System (OS) communication link, and a first device coupled to the processor and including a Management Component Transport Protocol (MCTP) module. The MCTP module may provide access to a first manageability feature of the first device. A BMC agent may a) receive a first MCTP command from the BMC via the BMC-To-OS communication link, the first MCTP command to configure the first manageability feature, and b) provide the first MCTP command to the MCTP module.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
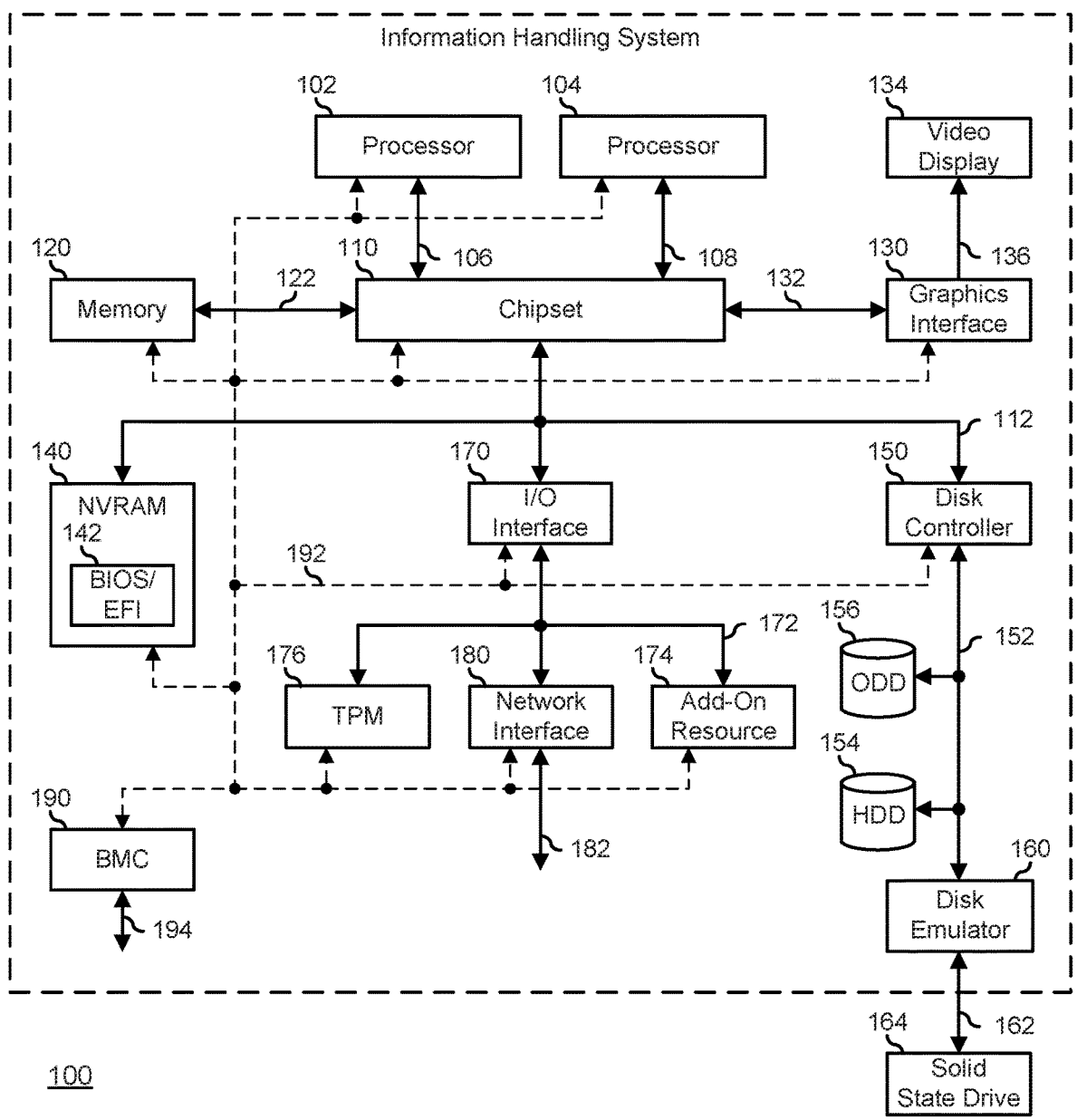
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices.

In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a WiFi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers.

Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like.

As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, the information handling system may represent one of many hundreds or thousands of other enterprise class processing systems in the datacenter. In such an environment, the information handling system may represent one of a wide variety of different types of information handling systems that perform the main processing tasks of the datacenter, such as computing equipment (servers, modular blade systems, and the like), switching and routing equipment (network routers, top-of-rack switches, and the like), data storage equipment (storage servers, network attached storage, storage area networks, and the like), or other equipment which the datacenter uses to perform the processing tasks. Further, the information handling system may represent management equipment that is networked to the processing equipment via a separate management network, and that operates to monitor, manage, and maintain the processing equipment. Finally, the information handling system may represent datacenter service equipment that is utilized by service technicians of the datacenter to perform monitoring, management, service, and maintenance of the processing and management equipment of the data center. Such datacenter service equipment would historically include an information handling system on a "crash cart," but increasingly includes mobile devices such as tablet computing devices, smart phone devices, and the like.

Figure 2:
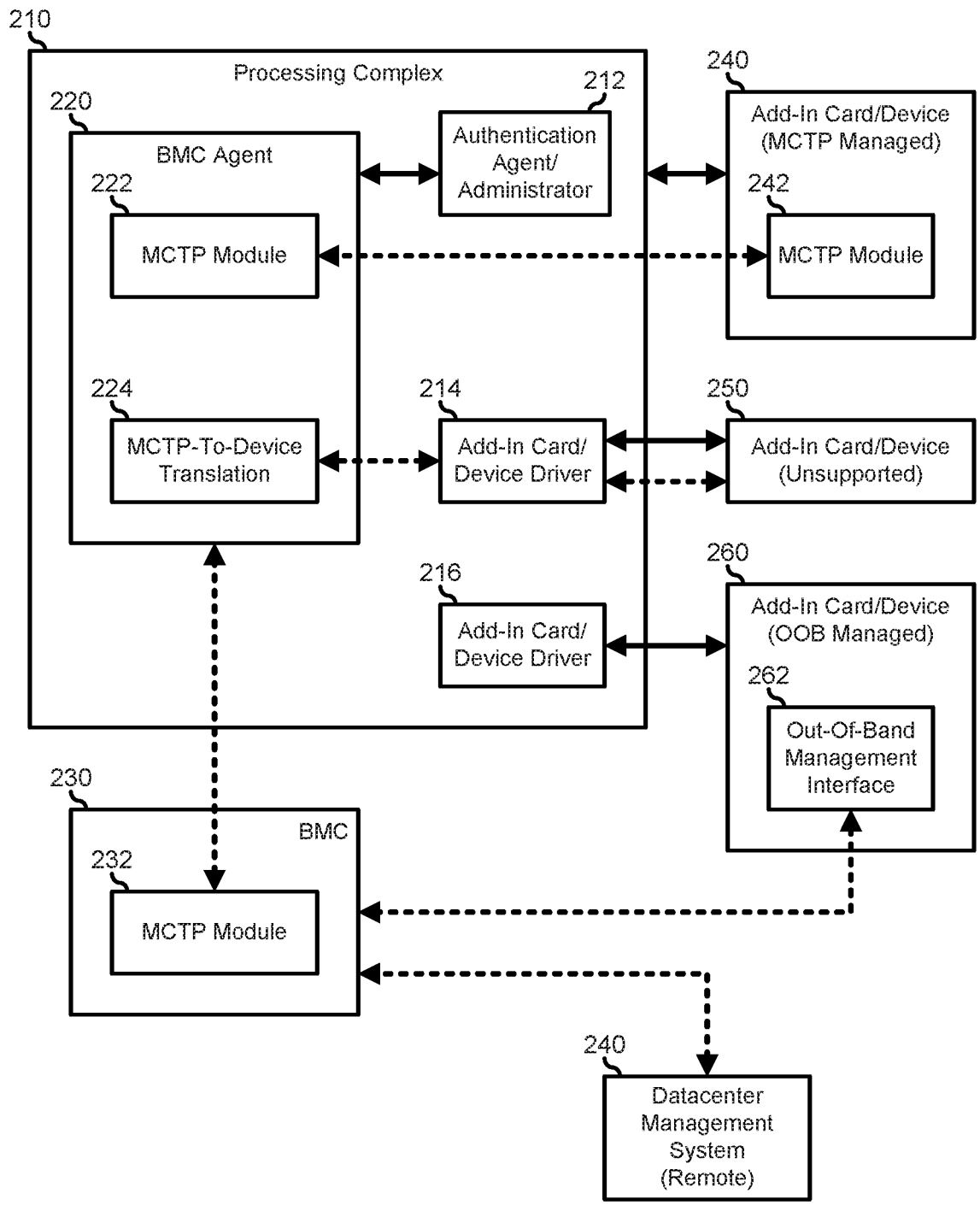
FIG. 2 is a block diagram of an information handling system according to another embodiment of the present disclosure.

FIG. 2 shows an information handling system 200 including a processing complex 210, a baseboard management controller (BMC) 230, and add-in cards and devices 240, 250, and 260 (hereinafter devices). Processing complex 210 includes an authentication agent and administrator 212 (hereinafter authentication agent), add-in card and device drivers 214 and 216 (hereinafter drivers), and a BMC agent 220. BMC agent 220 includes a Management Component Transfer Protocol (MCTP) module 222 and an MCTP-to-device translation module 224. BMC 230 includes an MCTP module 232. Device 240 includes an MCTP module 242. Device 260 includes an out-of-band (OOB) interface 262.

Processing complex 210 represents the hardware, software, firmware, and other elements associated with the performance of the processing tasks associated with information handling system 200. As such, processing complex 210 may be understood to include one or more data processors or processing cores, one or more input/output (I/O) devices such as processor, memory, or I/O controller hub, system memory including random access memory (RAM) and system read-only memory (ROM), mass data storage devices, video processors, network interface devices, or other devices typical to an information handling system, as needed or desired.

Processing complex 210 performs various processing tasks via devices 240, 250, and 260. As such, processing complex 210 is illustrated as being connected to devices 240, 250, and 260 with solid lines. The solid lines represent the processing tasks that are particular to the type of device that is being utilized. Here, device 240 represent a device that does not necessarily include an associated driver. For example, device 240 may include a storage array that is accessed via a network interface, such as a storage area network (SAN), a network attached storage (NAS), or other storage array. Here, drivers may be associated with the underlying connection interface, as needed or desired. For example, where device 240 is connected via a network interface card (NIC) or host bus adapter (HBA), the NIC or HBA may have an associated driver, as needed or desired. Devices 250 and 260 represent devices that are accessed by processing complex 210 via respective drivers 214 and 216. Here, devices 250 and 260 may include various add-in cards that are installed into information handling system 200 via slots or other interfaces, such as PCIe cards. Here further, while the slot or other interface may include an associated driver, the functions and features of device 250 are accessed via driver 214, and the functions and features of device 260 are accessed via driver 216. An example of devices 250 and 260 include network add-in cards such as a NIC or HBA that is associated with a particular network fabric (Ethernet, Fibre Channel, etc.).

Information handling system 200 represents a managed information handling system that monitors, manages, and maintains the elements of the information handling system by the communication of management information between various managing elements and the managed elements. Here, the dashed lines represent the flow of management information between the managing elements and the managed elements. Device 240 represents a managed device that includes one or more manageable functions or features that are accessible to be monitored, managed, and maintained via MCTP module 242. MCTP module 242 supports communications between device 240 and the various managing elements of information handling system 200. MCTP module 242 is independent of the underlying physical interface via which device 240 is connected in information handling system 200. MCTP module 242 may include message formats, transport descriptions, message exchange patterns, and other operational endpoint characteristics associated with device 240.

As such, the managing elements of information handling system 200 may access device 240 via MCTP module 242 in order to configure power management of the device, to monitor, to manage, and maintain operating settings of the device, to detect error conditions and to mitigate detected errors, or other management functions, as needed or desired. In a particular embodiment, MCTP module 242 supports a Management Controller Host Interface (MCHI), which provides discovery options and registration commands for device 240, thereby allowing a system BIOS, UEFI, or operating system to communicate with the MCTP module. Here, for example, MCTP module 242 may provide PCIe class codes in association with the PCI configuration space of information handling system 200, MCHI Description Table information, and control methods defined and exported via ACPI, and data structures exported via a SMBIOS of the information handling system. For this reason, device 240 is further identified as an MCTP Managed device.

Device 250 represents a managed device that includes one or more manageable functions or features that are not accessible to be monitored, managed, and maintained via a MCTP module, but instead provide accessibility to the management functions and features via driver 216. Here, device 250 may be controlled via register based reads and writes to the device, and driver 216 may provide a set of commands to access the register space of the device to monitor, manage, and maintain the device. Device 250 may be configured to provide interrupt-based operation and error notification that can be serviced via the SMBIOS. Device 250 may include a MCTP module similar to MCTP module 242, but for the purposes of the present disclosure where the device includes an MCTP module, it will be understood that one or more manageability function of the device will not be accessible via the MCTP module, but are accessible via driver 216. For this reason, device 250 is further identified as an Unsupported device.

Device 260 represents a managed device that includes one or more manageable functions or features that are accessible to be monitored, managed, and maintained via by BMC 230. Here, device 260 may include manageability functions and features that are accessible via a MCTP module or via driver 216. However, device 260 is distinguished by the addition of OOB management interface 262 that permits the BMC to access one or more of the manageability functions and features of the device out-of-band from processing complex 210, that is, without invoking code operating on a processor of the processing complex. For this reason, device 260 is further identified as an "OOB Managed" device. In a particular example, device 240 represents a storage device, such as a storage server, a SAN, a NAS, a software defined storage (SDS) or the like, device 240 represents a NIC, a Fibre Channel card, or the like, and device 260 represents a host bus adapter that supports a Network Controller Sideband Interface (NC-SI) to provide OOB communication with BMC 230. In a typical information handling system configured similarly to information handling system 200, a BMC would have no access to the manageability functions and features of devices that are MCTP managed similar to device 240, or to the manageability functions and features of devices that are accessed via a device driver similar to device 250.

BMC agent 220 represents an element of processing complex 210 that runs in a hosted environment of the processing complex to provide a secure communication interface between the processing complex and BMC 230. An example of BMC agent 220 includes a Dell-EMC OpenManage Server Administrator (OMSA), a Dell-EMC iDRAC Service Module (iSM), another management agent that runs in a hosted environment to provide secure communication between a processing complex and a BMC, as needed or desired. In a particular embodiment, BMC agent 220 communicates with BMC 230 via a NC-SI interface between the BMC and a NIC or HBA of information handling system 200. BMC agent 220 is an authenticated agent running on the hosted environment of processing complex 210 only after being authenticated onto the processing complex via authentication agent/administrator 212. Authentication agent/administrator 212 authenticates BMC agent 220 to operate on processing complex 210 and grants the BMC agent access to communicate with the NIC or HBA, and thence to BMC 230 via the NC-SI interface. In a particular embodiment, a system administrator launches BMC agent 220 and initiates an authentication session with authentication agent/administrator 212 to gain communication access to BMC 230. In another embodiment, authentication agent/administrator 212 utilizes a single sign-on (SSO) mechanism whereby a system administrator that is once authenticated through authentication agent/administrator 212 onto processing complex 210, the system administrator is granted access to BMC agent 220 to gain access to BMC 230. The details of authentication of a system administrator onto a processing complex, including SSO, is known in the art and will not be further described herein except as needed to understand the current embodiments.

BMC agent 220 includes a MCTP module 222, and BMC 230 includes a MCTP module 323. MCTP modules 222 and 232 are similar to MCTP module 242, as described above. Here, the manageable functions and features of device 240 become accessible to BMC 230 via BMC agent 220. In particular, MCTP module 232 communicates to pass MCTP-based commands to, and to receive MCTP-based information from MCTP module 222, which in turn communicates to pass MCTP-based commands to, and to receive MCTP-based information from MCTP module 242. In this way, BMC 230 obtains the ability to manage and maintain device 240.

MCTP-to-device translation module 224 represents a mapping module for mapping MCTP commands to the manageability functions and features of device 250. Here, MCTP module 232 communicates to pass MCTP-based commands to, and to receive MCTP-based information from MCTP module 222, which in turn communicates to pass MCTP-based commands to, and to receive MCTP-based information from MCTP-to-device translation module 214, which finally communicates to pass driver-based commands to, and to receive driver-based information from device 250. In this way, BMC 230 obtains the ability to manage and maintain device 250. In a particular embodiment, a data-center management system 240 remote from information handling system 200 directs BMC 230 to manage devices 240, 250, and 260.

Figure 3:
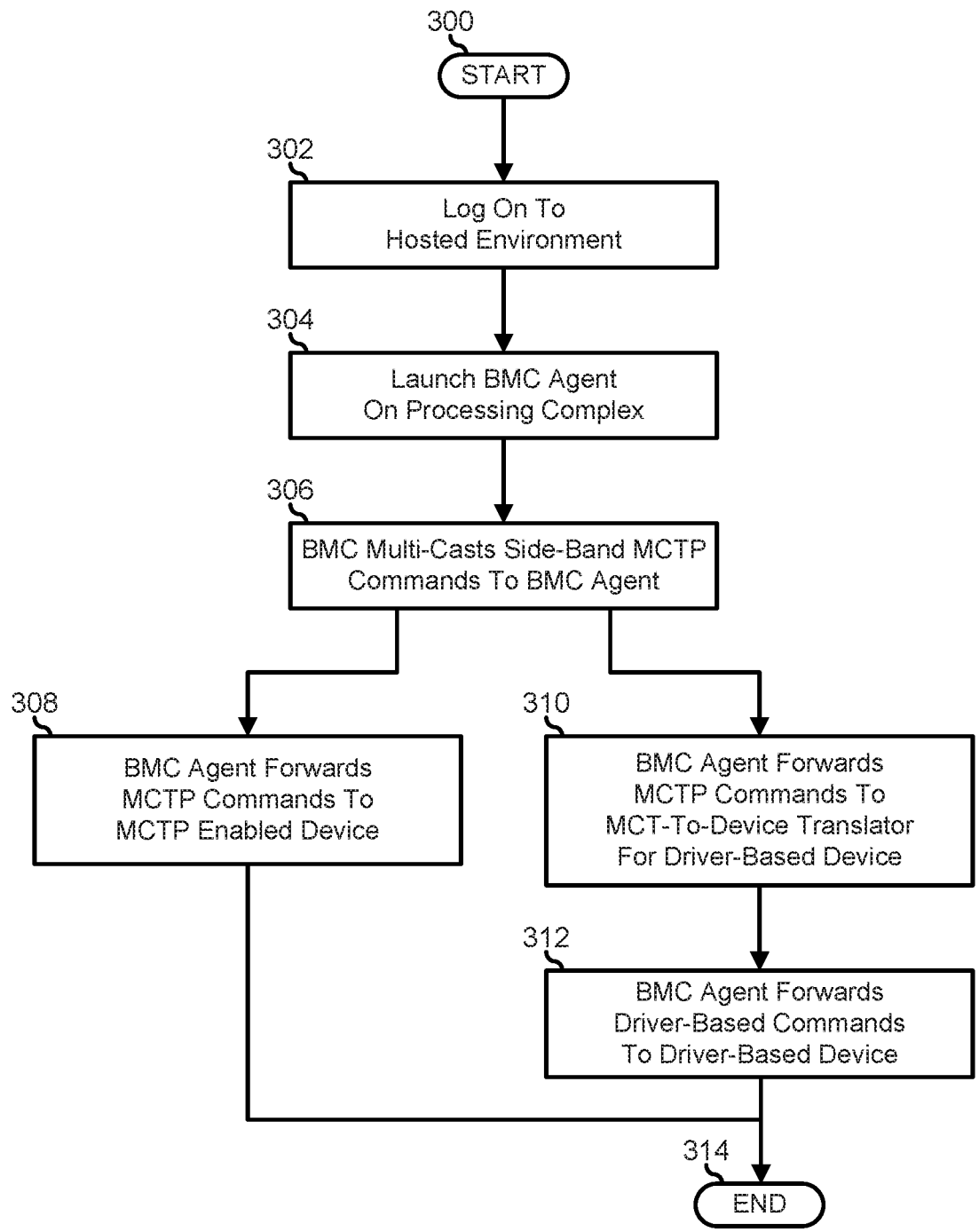
FIG. 3 is a flowchart illustrating a method for scaling baseboard management controller management of storage instrumentation.

FIG. 3 shows a method for scaling baseboard management controller management of storage instrumentation, starting at block 300. At block 302, a system administrator logs on to a hosted environment of an information handling system. For example, a system administrator may use a SSO function of authentication agent/administrator 212 to log on to a hosted environment on processing complex 210. Once logged on the hosted environment, the system administrator launches a BMC agent on the processing complex of the information handling system at block 304. Here, the SSO function may permit the system administrator to launch BMC agent 220 on processing complex 210. BMC agent 220 can then establish as secure session with BMC 230 via a NC-SI interface to permit the BMC to communication with the BMC agent.

At block 306, a remote administrator accesses the BMC to initiate administrative control of the MCTP managed devices and unsupported devices of the information handling system by multi-casting side-band MCTP commands to the BMC agent. The BMC agent determines it the MCTP commands are targeted to a MCTP managed device or to an unsupported device. If the MCTP commands are targeted to a MCTP managed device, the BMC agent forwards the MCTP commands to the target MCTP managed device in block 308, and the method ends in block 314. For example, BMC 230 can provide MCTP commands targeted to device 240, and MCTP module 222 can forward the MCTP commands to MCTP module 242. Here, it will be understood that the MCTP managed devices respond to the MCTP commands by applying configuration changes, reporting status, or the like, as dictated by the particular MCTP commands, and that the BMC agent provides the responses from the MCTP managed devices to the BMC.

If the MCTP commands are targeted to an unsupported device, the BMC agent forwards the MCTP commands to a MCTP-to-device translator in block 310, the MCTP-to-device translator forwards device commands to the target unsupported device in block 312, and the method ends in block 314. For example, BMC 230 can provide MCTP commands targeted to device 250, and MCTP module 222 can forward the MCTP commands to MCTP-to-device translator 224 to translate the MCTP commands into device level instructions and the MCTP-to-device translator can provide the device level instructions to device 250. Here, it will be understood that the unsupported devices respond to the MCTP commands by applying configuration changes, reporting status, or the like, as dictated by the particular device level instructions, and that the BMC agent provides the responses from the unsupported devices to the BMC.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a processor configured to instantiate a baseboard management controller (BMC) agent including a first Management Component Transport Protocol (MCTP) module;
a BMC configured to communicate with the processor via a BMC-to-Operating System (OS) communication link, the BMC including a second MCTP module;
a first device coupled to the processor and including a third MCTP module, the third MCTP module to provide access to a first manageability feature of the first device; and
a second device coupled to the processor and including a driver-based second manageability feature of the second device, wherein the second manageability feature is accessed via a second device driver, wherein the processor is further configured to instantiate the second device driver to access the second manageability feature;
wherein the first MCTP module is configured to a) receive a first MCTP command from the second MCTP module via the BMC-To-OS communication link, the first MCTP command to configure the first manageability feature, and b) provide the first MCTP command to the third MCTP module without invoking a first driver associated with the first device, and is further configured to a) receive a second MCTP command from the first MCTP module via the BMC-to-OS communication link, the second MCTP command to configure the second manageability feature, b) translate the second MCTP command to a driver-based instruction, and c) provide the driver-based instruction to the second device driver to configure the second manageability feature.

2. The information handling system of claim 1, wherein the first MCTP module is further configured to receive a reply to the first MCTP command from the third MCTP module, and to provide the reply to the second MCTP module via the BMC-to-OS communication link.

3. The information handling system of claim 1, wherein the first device comprises a storage device.

4. The information handling system of claim 3, wherein the storage device includes one of a storage area network, a network attached storage, and a storage server.

5. The information handling system of claim 1, wherein the second device comprises one of a network interface card and a host bus adapter.

6. The information handling system of claim 1, further comprising:
a third device coupled to the processor and including a third manageability feature of the third device;
wherein the BMC manages the third manageability feature out-of-band from the processor.

7. The information handling system of claim 1, wherein the processor is further configured to instantiate an authentication agent configured to authenticate a user via a single-sign-on to the information handling system, and wherein the BMC agent is launched in response to authenticating the user.

8. A method, comprising:
launching, on a processor of an information handling system, a baseboard management controller (BMC) agent including a first Management Component Transport Protocol (MCTP) module;
establishing, by the processor, a BMC-to-Operating System (OS) communication link between a BMC of the information handling system and the BMC agent;
launching, on the BMC, a second MCTP module;
receiving, by the first MCTP module, a first MCTP command from the second MCTP module via the BMC-To-OS communication link, the first MCTP command to configure a first manageability feature of a first device coupled to the processor, the first device including a third MCTP module;
providing, by the first MCTP module, the first MCTP command to the third MCTP module without invoking a first driver associated with the first device;
receiving a second MCTP command from the second MCTP module via the BMC-To-OS communication link, the second MCTP command to configure a driver-based second manageability feature of a second device coupled to the processor, wherein the second manageability feature is accessed via a second device driver;
translating the second MCTP command to a driver-based instruction; and
providing the driver-based instruction to a device driver to configure the second manageability feature.

9. The method of claim 8, further comprising:
receiving, by the first MCTP module, a reply to the first MCTP command from the third MCTP module; and
providing, by the first MCTP module, the reply to the second MCTP module via the BMC-to-OS communication link.

10. The method of claim 8, wherein the first device comprises a storage device.

11. The method of claim 10, wherein the storage device includes one of a storage area network, a network attached storage, and a storage server.

12. The method of claim 8, wherein the second device comprises one of a network interface card and a host bus adapter.

13. The method of claim 8, further comprising:
managing, by the BMC, a third device coupled to the processor out-of-band from the processor.

14. The method of claim 8, further comprising:
authenticating a user onto the processor via a single-sign-on to processor, wherein the BMC agent is launched in response to authenticating the user.

15. A system, comprising:
an information handling system including a processor, a memory for storing code, a baseboard management controller (BMC), a first device, and a second device; and
a datacenter management system coupled to the BMC;
wherein:
the BMC is configured to communicate with the processor via a BMC-to-Operating System (OS) communication link, and includes a first Management Component Transport Protocol (MCTP) module;
the first device is coupled to the processor and includes a second MCTP module, the second MCTP module to provide access to a first manageability feature of the first device without invoking a first driver associated with the first device;
the second device is coupled to the processor and includes a driver-based second manageability feature of the second device, wherein the second manageability feature is accessed via a second device driver;

the code includes a BMC agent that includes a third MCTP module and that is configured to a) receive a first MCTP command from the first MCTP module via the BMC-To-OS communication link, the first MCTP command to configure the first manageability feature, and b) provide the first MCTP command to the second MCTP module;

the datacenter management system is configured to provide the first MCTP command to the BMC;

the code further includes the second device driver to access the second manageability feature;

the BMC agent is further configured to a) receive a second MCTP command from the first MCTP module via the BMC-to-OS communication link, the second MCTP command to configure the second manageability feature, b) translate the second MCTP command to a driver-based instruction, and c) provide the driver-based instruction to the second device driver to configure the second manageability feature.

16. The system of claim 15, wherein:

the third MCTP module is further configured to receive a reply to the first MCTP command from the third MCTP module, and to provide the reply to the first MCTP module via the BMC-to-OS communication link; and the BMC is configured to provide the reply to the datacenter management system.

17. The system of claim 15, wherein:

the information handling system further includes a third device coupled to the processor and including a third manageability feature of the third device; and the BMC manages the third manageability feature out-of-band from the processor.

* * * * *